US008760714B1

(12) United States Patent
Keithley

(10) Patent No.: US 8,760,714 B1
(45) Date of Patent: Jun. 24, 2014

(54) COLOR SPACE CONVERSION

(75) Inventor: Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 795 days.

(21) Appl. No.: 12/868,562

(22) Filed: Aug. 25, 2010

Related U.S. Application Data

(60) Provisional application No. 61/237,212, filed on Aug. 26, 2009.

(51) Int. Cl.
*H04N 1/60* (2006.01)
(52) U.S. Cl.
USPC ....... 358/1.9; 348/589; 348/611; 348/231.99; 348/240.2; 348/700; 382/164; 382/167; 382/300; 399/39
(58) Field of Classification Search
None
See application file for complete search history.

(56) References Cited

U.S. PATENT DOCUMENTS

| 5,736,989 | A | 4/1998 | Lhotak |
| 6,031,642 | A | 2/2000 | Vondran, Jr. |
| 6,421,140 | B1 | 7/2002 | Hui |
| 2004/0042020 | A1* | 3/2004 | Vondran, Jr. ................... 358/1.9 |
| 2005/0156944 | A1* | 7/2005 | Someya et al. ................ 345/611 |
| 2010/0284030 | A1* | 11/2010 | Yoshida et al. ................ 358/1.9 |

OTHER PUBLICATIONS

Vondran, G., "Radial and Pruned Tetrahedral Interpolation Techniques," *Hewlett-Packard Development Company, L.P.* (1998).

\* cited by examiner

*Primary Examiner* — Tammy Pham
*Assistant Examiner* — Idowu O Osifade

(57) ABSTRACT

A color space converter converts data points from one color space to another color space using a lookup table. Color space converters may be used in any device that involves image processing, such as displays and printers. An interface receives an input value in a first color space. A controller access a lookup table stored in memory to determine an upper bound and a lower bound of a subset of the color space. An output value is interpolated between the upper bound and the lower bound using interpolation values. The interpolation values of the last subset in any dimension of the color space are modified by a scale factor to approximate ideal values.

20 Claims, 12 Drawing Sheets

| Actual | Ideal | Error |
|--------|-------|-------|
| 0 | 0 | - |
| 1 | 1.1 | 0.07 |
| 2 | 2.1 | 0.13 |
| 3 | 3.2 | 0.20 |
| 4 | 4.3 | 0.27 |
| 5 | 5.3 | 0.33 |
| 6 | 6.4 | 0.40 |
| 7 | 7.5 | 0.47 |
| 8 | 8.5 | 0.53 |
| 9 | 9.6 | 0.60 |
| 10 | 10.7 | 0.67 |
| 11 | 11.7 | 0.73 |
| 12 | 12.8 | 0.80 |
| 13 | 13.9 | 0.87 |
| 14 | 14.9 | 0.93 |
| 15 | 16.0 | 1.00 |

| | | |
|---|---|---|
| 0 0 0 0 | 0 0 0 0 0 0 | 0 0 0 0 0 0 |
| 0 0 0 1 | 0 0 0 1 0 0 | 0 0 0 1 0 0 |
| 0 0 1 0 | 0 0 1 0 0 0 | 0 0 1 0 0 0 |
| 0 0 1 1 | 0 0 1 1 0 0 | 0 0 1 1 0 0 |
| 0 1 0 0 | 0 1 0 0 0 0 | 0 1 0 0 0 1 |
| 0 1 0 1 | 0 1 0 1 0 0 | 0 1 0 1 0 1 |
| 0 1 1 0 | 0 1 1 0 0 0 | 0 1 1 0 0 1 |
| 0 1 1 1 | 0 1 1 1 0 0 | 0 1 1 1 0 1 |
| 1 0 0 0 | 1 0 0 0 0 0 | 1 0 0 0 1 0 |
| 1 0 0 1 | 1 0 0 1 0 0 | 1 0 0 1 1 0 |
| 1 0 1 0 | 1 0 1 0 0 0 | 1 0 1 0 1 0 |
| 1 0 1 1 | 1 0 1 1 0 0 | 1 0 1 1 1 0 |
| 1 1 0 0 | 1 1 0 0 0 0 | 1 1 0 0 1 1 |
| 1 1 0 1 | 1 1 0 1 0 0 | 1 1 0 1 1 1 |
| 1 1 1 0 | 1 1 1 0 0 0 | 1 1 1 0 1 1 |
| 1 1 1 1 | 1 1 1 1 0 0 | 1 1 1 1 1 1 |

121  122  123

| Input | Index | Actual | Actual' | Ideal | Error |
|---|---|---|---|---|---|
| 0 | 0 | 0 | 0 | 0 | 0.000 |
| 1 | 4 | 4 | 1 | 1.1 | 0.067 |
| 2 | 8 | 8 | 2 | 2.1 | 0.133 |
| 3 | 12 | 12 | 3 | 3.2 | 0.200 |
| 4 | 16 | 17 | 4.25 | 4.3 | 0.017 |
| 5 | 20 | 21 | 5.25 | 5.3 | 0.083 |
| 6 | 24 | 25 | 6.25 | 6.4 | 0.150 |
| 7 | 28 | 29 | 7.25 | 7.5 | 0.217 |
| 8 | 32 | 34 | 8.5 | 8.5 | 0.033 |
| 9 | 36 | 38 | 9.5 | 9.6 | 0.100 |
| 10 | 40 | 42 | 10.5 | 10.7 | 0.167 |
| 11 | 44 | 46 | 11.5 | 11.7 | 0.233 |
| 12 | 48 | 51 | 12.75 | 12.8 | 0.050 |
| 13 | 52 | 55 | 13.75 | 13.9 | 0.117 |
| 14 | 56 | 59 | 14.75 | 14.9 | 0.183 |
| 15 | 60 | 63 | 15.75 | 16.0 | 0.250 |

FIG. 13

COLOR SPACE CONVERSION

CROSS-REFERENCE TO RELATED APPLICATION

This application claims the benefit of U.S. Provisional Application No. 61/237,212 filed Aug. 26, 2009, which is hereby incorporated by reference in its entirety.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

The science of quantifying the human perception of color, or "colorimetry," defines colors as vectors in a color space or color model. The conversion of vectors from one color space to another color space using a mapping function is commonly used in image processing for printing or displaying images. For example, when an image input device, such as a scanner, a digital camera, or a computer, uses a different color space than that of an image output device, such as a printer or a display, color space conversion is typically performed to maintain the color integrity of an image.

Color space conversion is generally a challenging process because the mapping function from one color space to another color space is rarely linear. That is, the conversion algorithm necessary for one area in the color space is not effective in a second area in the color space. Rather than mathematically performing the color space conversion, a look up table may be used to perform cost effective color space conversion.

A typical example of a color space includes three color components, with each color component represented by eight bits, or 24 bits total for all of the color components of any given color in the color space. Using this example, there are $(2^8)^3$ possible colors, requiring a lookup table large enough to store $2^{24}$ values for both the input and output color spaces.

SUMMARY

In one aspect, a method of converting color spaces includes receiving an input value in a first color space, wherein the input value includes a first set of bits and a second set of bits. A subset of the first color space is selected based on the first set of bits. The first color space includes (i) a terminal subset and (ii) at least one preceding subset that is adjacent to the terminal subset. A controller accesses a lookup table based on the selected subset of the first color space, wherein the lookup table includes (i) a first set of interpolation values spaced by a first interval for the at least one preceding subset and (ii) a second set of interpolation values spaced by a second interval for the terminal subset. The controller interpolates an output value in a second color space using an interpolation value selected from either the first set of interpolation values or the second set of interpolation values based on the second set of bits of the input value.

The present invention is defined by the following claims, and nothing in this section should be taken as a limitation on those claims. The preferred embodiments will now be described with reference to the attached drawings.

BRIEF DESCRIPTION OF THE DRAWINGS

FIG. 13 illustrates a comparison of the final interpolation values and ideal interpolation values.

DETAILED DESCRIPTION

As mentioned above, a lookup table can be used during a color conversion process. An ideal lookup table for color space conversion would include every possible input for each color. Because of memory constraints and other concerns, such a lookup table is not practical. Instead, a sparse lookup table may be used that includes only a fraction of possible input values. When an input value is received that is not in the lookup table, the output value is interpolated from known output values. The sparse lookup table may be divided into interpolation subsets having an upper bound and a lower bound. Consecutive interpolation subsets overlap (i.e., the upper bound of one interpolation subset is the lower bound of the next), which leads to either the first or the last interpolation subsets (terminal interpolation subset) having one more interpolation value than needed. Accordingly, a separate interpolation algorithm is used for the terminal interpolation subset. The separate interpolation algorithm may be implemented using any of the three embodiments discussed below.

A first embodiment defines an upper bound of the terminal interpolation subset using an output value that is out of the normal range, using the lookup table include additional, but minimal, data storage. A second embodiment implements the output value that is out of the normal range by encoding the output value elsewhere in the color space. A third embodiment scales interpolation values by a varying scale factor so that consecutive intervals between interpolation values are unequal.

A color space converter maps colors from one color space to another color space. The color space may be an additive color system such as red, green, and blue (RGB) or a subtractive color system such as cyan, magenta, and yellow (CMY). Additionally, the color space may include four colors such as cyan, magenta, yellow and black or six colors such as cyan, light cyan, magenta, light magenta, yellow, and black. Additional colors, such as light black, silver, gold and other combinations are possible.

Figure 1:
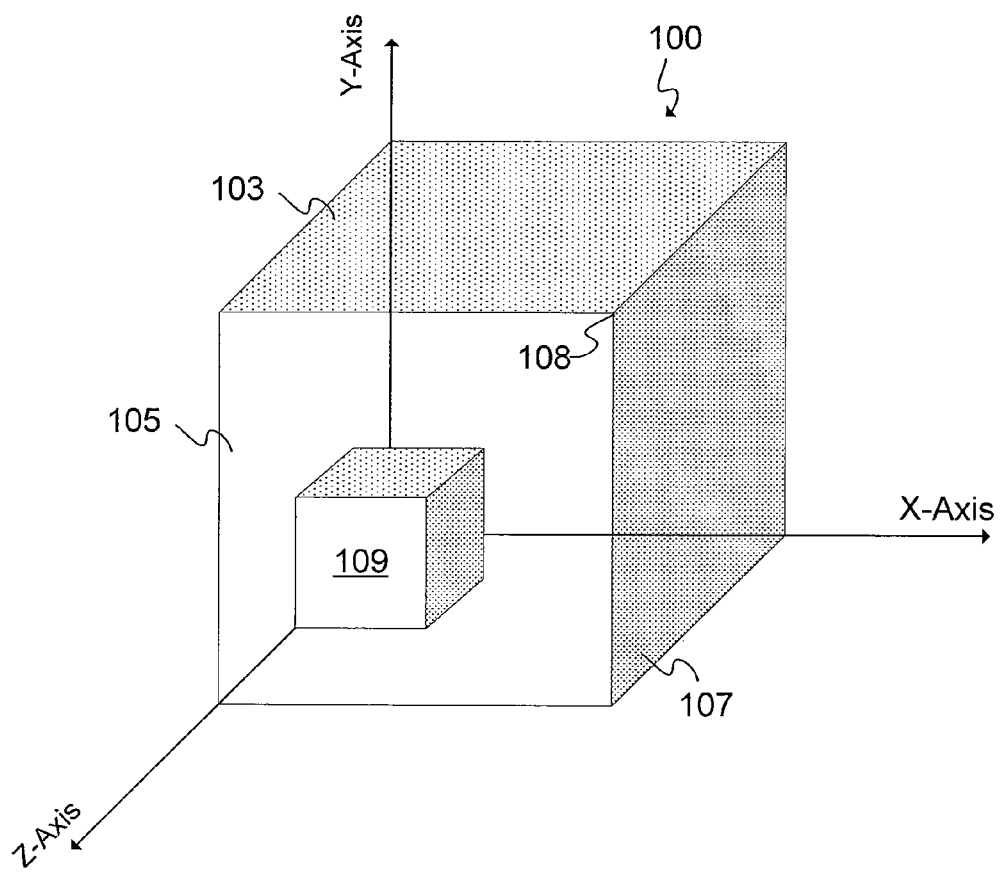
FIG. 1 illustrates a graphical model of a color space.

A set of representative points in the first color space are defined (e.g., in a lookup table) and points in the first color space between the representative points are interpolated based on the nearest representative points. FIG. 1 illustrates a mathematical model of a color space including three colors. The representative points may be in a uniform grid in the color space. The color space may be represented graphically as a cube 100 with each axis corresponding to a color. For example, the X-axis may correspond to red, the Y-axis may correspond to green, and the Z-axis may correspond to blue. Every point in the color space is represented by a value (X, Y, Z). In one implementation, each component X, Y, and Z is represented by an 8-bit value. Using the mathematical model in FIG. 1, each surface of the cube represents either the maximum value or the absence of a particular color. For example, surface 103 is the maximum value for green and the two-dimensional plane of surface 103 includes all combinations of blue and red. Surface 105 is the maximum value for blue and the two-dimensional plane of surface 104 includes all combinations of green and red. Surface 107 is the maximum value for red and the two-dimensional place of surface 107 includes all combinations of blue and green. The origin of the plot, which is the point that the X, Y, and Z axes intersect corresponds to the absence of color (or black). The maximum value for X, Y, and Z, at point 108, indicates white. A neutral line of gray runs diagonally from the origin to the maximum values for X, Y, and Z.

The cube 100 may be divided into sub-cubes. Any input point in the first color space may be used to define a sub-cube 109. The sub-cubes are defined by smaller ranges in one or more of the axes. The cube 100 is divided differently depending on the interpolation technique. Interpolation techniques include, for example, prism interpolation, tetrahedral interpolation, trilinear interpolation, tricubic interpolation, radial interpolation, pruned interpolation, or any combination thereof.

Figure 2:
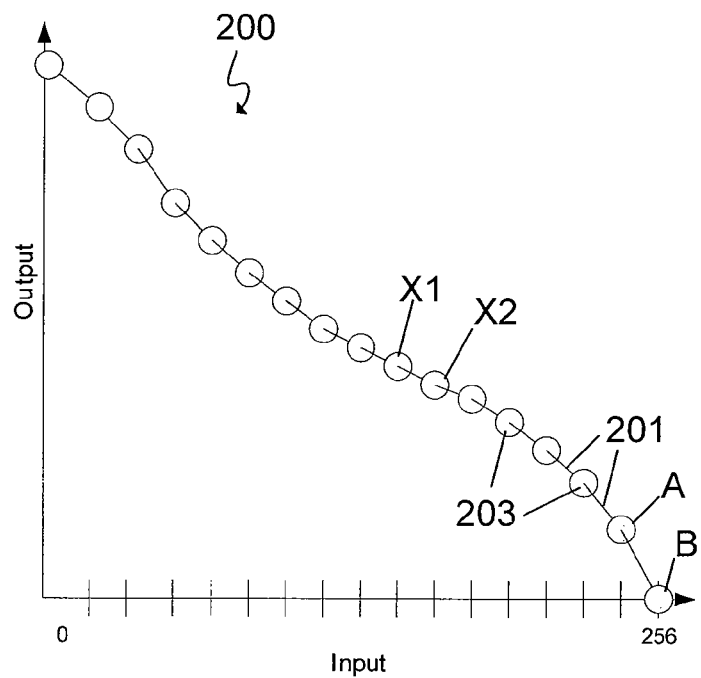
FIG. 2 illustrates an example mapping function.
Figure 3:
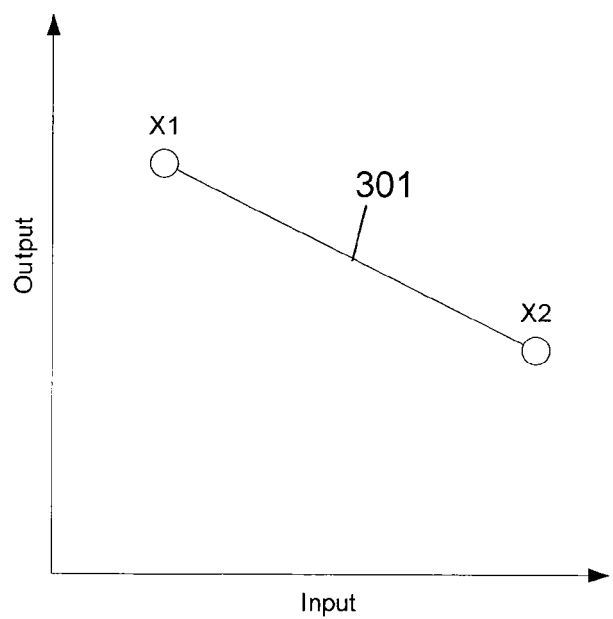
FIG. 3 illustrates an example of a linear segment of the mapping function of FIG. 2.

FIG. 2 illustrates an example mapping function 200 for converting from a first color space to a second color space. For purposes of illustration, FIGS. 2 and 3 illustrate one dimension or color; however, it should be appreciated that the principles discussed may also be applied to each of the plurality of dimensions or colors, making up a color space. The mapping function 200 is nonlinear. The mapping function 200 is approximated by sixteen linear segments 201 separated by seventeen representative points 203. The mapping function 200 may be stored in a lookup table having an entry for each combination of the 17 values for each color. Each entry provides the output values for the second color space. In the case of printing, the output value describes a quantity of marking material for each of the colors of the second color space. The lookup table includes $17^3$ output values, and is referred to as a "seventeen cubed table." The mapping function 200 may be a piecewise linear fit to an ideal nonlinear function.

FIG. 3 illustrates an example of a linear segment 301 separated by representative points X1 and X2. The linear segment 301 is a subset of the dimension of the first color space. The linear segment 301 represents a subset of the color space that is not the last color space. Output values are known at points X1 and X2. If the input value is at any other location (between X1 and X2), the output is selected using interpolation, such as linear interpolation. For example, if the input is halfway between lower bound X1 and upper bound X2, an output value is selected halfway between Output[X1] (lower bound output) and Output[X2] (upper bound output). An example function is shown below:

$$\text{Output}[\text{In}] = \text{Output}[X1] + (\text{Output}[X2] - \text{Output}[X1]) \cdot \frac{(\text{In} - X1)}{(X2 - X1)} \quad [\text{Eq. 1}]$$

Figure 4:
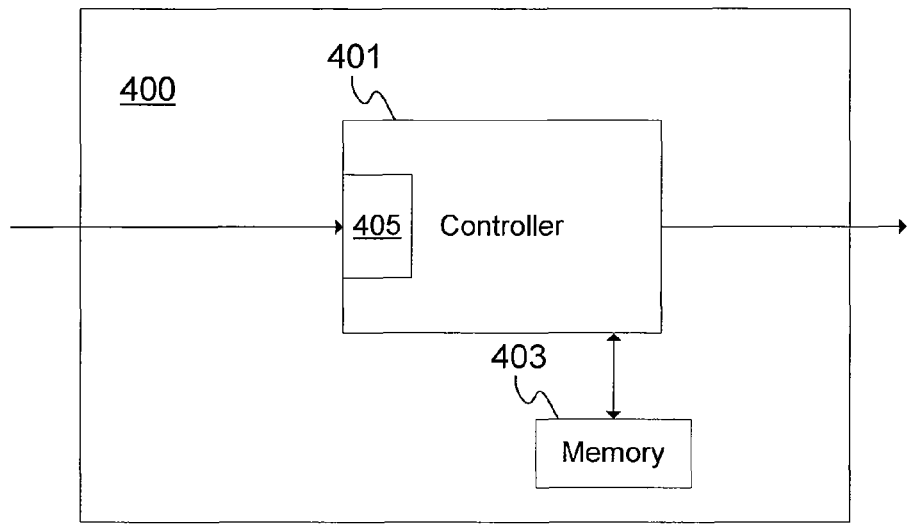
FIG. 4 illustrates one implementation of a color space converter.

FIG. 4 illustrates an example color space converter 400 that includes a controller 401 and a memory 403. The controller 401 includes an interface 405 for interfacing with a device that utilizes the first color space. The controller 401 may be a general purpose controller, as described below. The controller 401 is configured to perform interpolation using one or more lookup tables. And, the memory 403 is configured to store the one or more lookup tables.

The controller 401 may include a digital signal processor, an application specific integrated circuit (ASIC), a field programmable gate array, a logical digital circuit, or other now known or later developed controller. The memory 403 may be any known type of volatile memory or non-volatile memory. The memory 403 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory.

Figure 5:
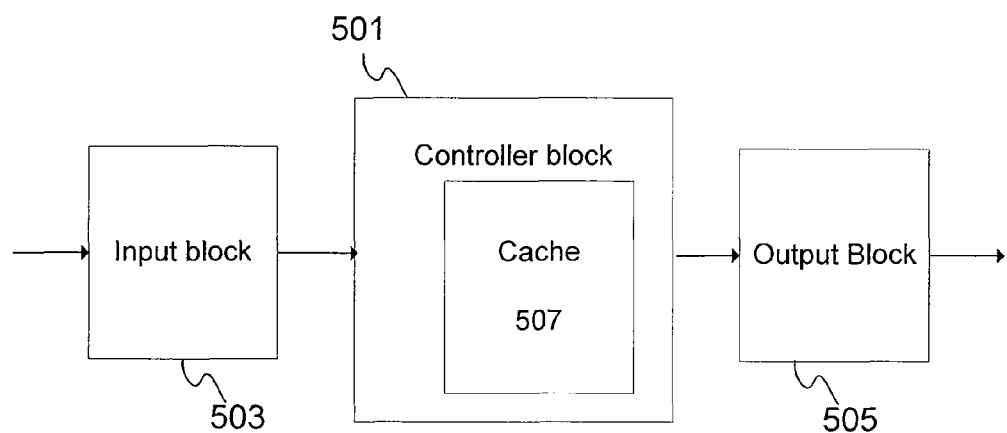
FIG. 5 illustrates another implementation of a color space converter.

In one implementation, as shown by FIG. 5, the color space conversion may be performed in a hardware pipeline. For example, a portion of the pipeline comprises an input block 503, a controller block 501, and an output block 505. The functions described with respect to controller 401 may be implemented by controller block 501, and the functions described with respect to memory 403 may be implemented by cache 507.

Referring back to FIG. 2, the mapping function 200 is for one color of a color space. In one implementation, the mapping function 200 includes input values of 8 bits, though other bit values, such as 10 bit input values or any other size input values, may be used. The mapping function 200 extends from input values 0 to 256 ($2^n$), which are $2^n+1$ values. However, the input value range extends from 0 to 255 ($2^n-1$), which includes $2^n$ values. Because the input value range and the mapping function 200 do not precisely overlap, the surfaces 103, 105, and 107 cannot be reached by the mapping function.

The mapping function 200 is divided into subsets. Input values comprise a more significant set of bits, which may be four leftmost bits (i.e., the four most significant bits), and a less significant set of bits, which may be the four rightmost bits (i.e., the four least significant bits). When an input value in a first color space is received at interface 405, the controller 401 selects a subset of the first color space based on the more significant set of bits. Accordingly, the upper bounds and lower bounds are evenly spaced, with the final sample point at $2^n$, which is just slight out of reach of the mapping function 200. The lower point may be defined by the four most significant bits, and the upper bound may be selected as one more than the four most significant bits. The four least significant bits, which may be accessed using a function such as Mod(In, 16), are used for the interpolation between the upper bound and the left bound.

The controller 401 then accesses a lookup table based on the selected subset of the first color space. In one example, the lookup table includes an upper bound and a lower bound, and the controller 401 uses interpolation values to interpolate an output value between the upper bound and the lower bound. The size of the lookup table is defined by the number of upper bounds and lower bounds. The interpolation value or interpolation index, which is shown in Equation 1 as the quantity (In-X1), is the difference between the lower bound and the input value using the index of one dimension of the color space.

In another implementation, the interpolation values are also stored in a lookup table, which may be the same lookup table as the upper bound and the lower bound. This implementation requires additional memory for storage of the larger lookup table.

FIG. 2 illustrates 16 subsets, though any number of subsets is possible. There are $2^8$ or 256 possible input values. Each subset, including the upper bound and the lower bound, can be used for 17 input values. One input value overlaps each pair of consecutive subsets. Accordingly, the distance between the upper bound and the lower bound of the last subset (terminal subset), which extends from point A to point B, should be slightly smaller that of the preceding subset. However, as a practical limitation of hardware, the distances are the same. Forcing the terminal subset into the size of the preceding subsets means that the mapping function 200 will never reach point B. Using the model of FIG. 1, point B corresponds to surfaces 103, 105, and 107.

Figure 6:
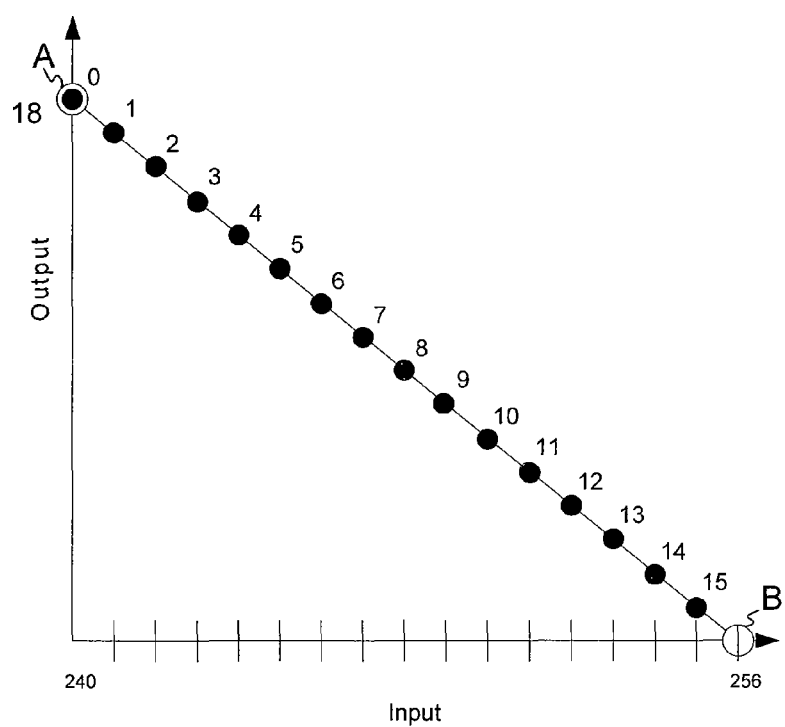
FIG. 6 illustrates an interpolation graph of the terminal subset of the mapping function of FIG. 2.

FIG. 6 illustrates that there are 16 positions between points A and B in the lookup table but only 15 interpolation values are possible. Therefore, linear interpolation in the last subset using Equation 1 requires division by 15 (i.e., X2−X1=255−240=~15). However, division by 15 is costly in many binary-based systems. Accordingly, the error involved with normalizing the interpolation using 16 rather than 15 is often accepted because of the expense of using divider hardware.

FIG. 6 illustrates an interpolation graph of the terminal subset. The quantity (In-X1) or (Input value-Lower bound of the subset) is the interpolation value. FIG. 6, as well as the other graphs, depicts numerical values for the interpolation values. Because 16 positions are used, the final position, corresponding to input value 256, is never reached. Referring back to the model of FIG. 1, surfaces 103, 105, and 107 each correspond to a final position that cannot be reached.

Error will be introduced into the interpolation values. When the input value is 255 and assuming Output[X1]=18 and Output[X2]=0, Equation 1 provides:

$$\text{Output}[255] = \text{Output}[X1] + (\text{Output}[X2] - \text{Output}[X1]) \cdot \frac{(\text{In} - X1)}{(X2 - X1)}$$

$$\text{Output}[255] = 18 + (-18)(255 - 240)/(256 - 240)$$

$$\text{Output}[255] = 18 - 18 * 15/16 = 1.125$$

A more accurate linear interpretation, using division by 15 provides Output[255]=18+(018)*15/15=0, which would reach the surfaces of the cube shown in FIG. 1. The following embodiments provide three solutions to provide better estimation of the linear interpretation using division by 15 without requiring the use of divider hardware.

First Embodiment

Figure 7:
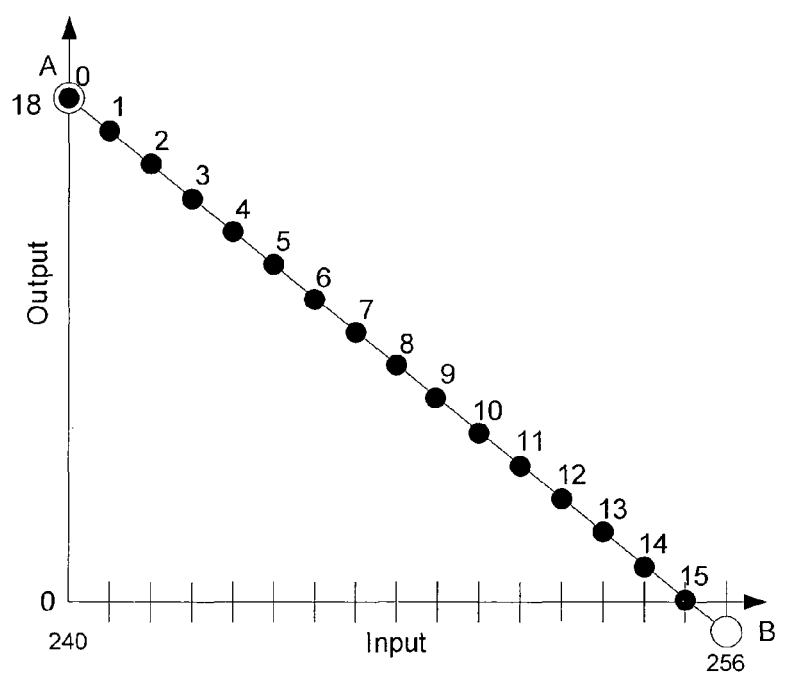
FIG. 7 illustrates an interpolation graph of the terminal subset of the mapping function of FIG. 2 according to a first embodiment.

FIG. 7 illustrates an interpolation graph of a first embodiment. The interpolation graph of the first embodiment relies on 16 interpolation points. The upper bound B however is moved so that the interpolation points fall closer to the idea location. However, in order to achieve this, the output that corresponds to upper bound B is negative or otherwise out of the range of normal output values. As an example, an output value is "out of the range" when the output value corresponds to quantities of marking material, such as ink or toner, that is not realizable (i.e., nonexistent). A negative quantity of ink or toner does not exist. An output of 257 on a 0 to 255 scale does not exist. Likewise, a quantity of ink or toner above 100% of the possible quantity does not exist.

The out of range upper bound may be determined with algebra. The out of range upper bound is used for Output [X2]. The desired value for Output[255] is zero.

$$\text{Output}[255] = 0 = \text{Output}[X1] + (\text{Output}[X2] - \text{Output}[X1]) \cdot \frac{(\text{In} - X1)}{(X2 - X1)}$$

$$0 = 18 + (\text{Output}[X2] - 18)(15/16)$$

$$\text{Output}[X2] = -1.2$$

If Output[X2] is stored in the lookup table as integers, it would be rounded to −1. Using Output[X2]=−1, the Output[255] using linear interpolation may be calculated as follows:

$$\text{Output}[255] = \text{Output}[X1] + (\text{Output}[X2] - \text{Output}[X1]) \cdot \frac{(\text{In} - X1)}{(X2 - X1)} =$$

$$18 + (-1 - 18)(15/(16)$$

$$\text{Output}[255] = 18 - 19 * 15/16 = -0.1875$$

The output value −0.1875 is stored as an integer is 0, which is exactly the desired output for In=255.

There is no quantity of ink or toner that corresponds to −1.2. However, an input value of 256 is also not possible so the upper bound of −1.2 will never be used for an output value. When the output value for upper bound B is set to this "out of range" value, the accurate interpolation of the preceding 15 input values using Equation 1 is now possible.

The output values lookup table may be selected by measurement. That is, a sample image or test pattern is displayed or printed for representative output values in the lookup table and measured. The measurement is compared to the source image. However, the out of range points cannot be measured. Instead, the out of range numbers are calculated. In other words, some of the output values in the lookup table in the first embodiment are supplied from measurement and some of the output values are calculated.

Figure 8:
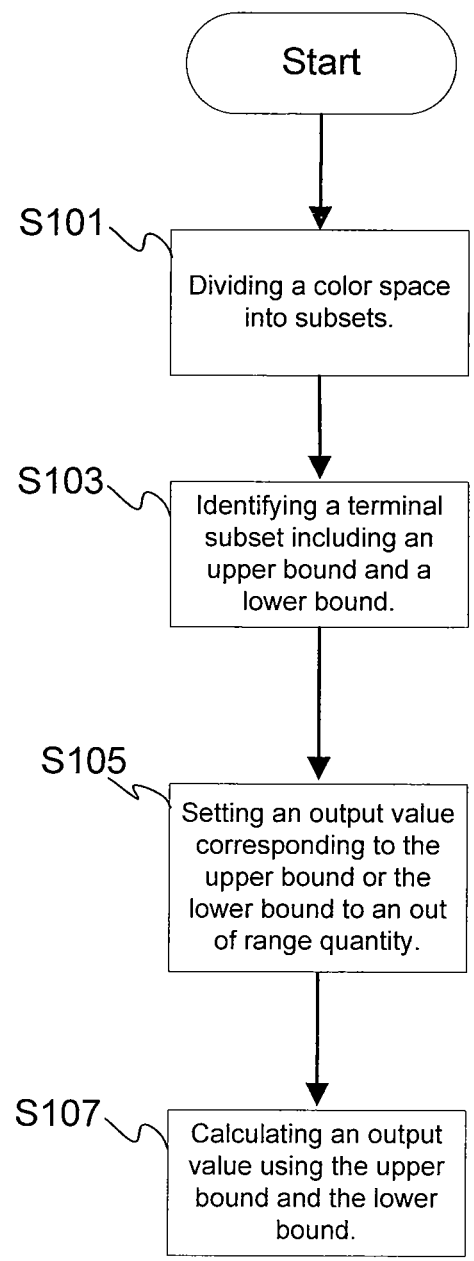
FIG. 8 illustrates a flow chart an example of an algorithm for the first embodiment and the second embodiment.

FIG. 8 illustrates a flow chart of an example algorithm for the first embodiment. The lookup table may be modified by controller 401 in real-time or it may be created ahead of time and stored in memory 403. At S101, the color space is divided into subsets. The division may be predetermined and stored in the lookup table. Alternatively, controller 401 may divide the color space into subsets. At S103, the controller 401 identifies a terminal subset including an upper bound and lower bound. The terminal subset may be the last subset in the color space. At S105, the output value corresponding to the upper bound is set to an out of range quantity. At S107, the controller 401 calculates an output value using the upper bound and the lower bound of the terminal subset.

If the input value of each entry in the lookup is described by 8 bits, at least one additional bit is used to describe negative values or values exceeding 255, which requires increasing the size of the lookup table. The extra bit could be used to extend the range from $-2^n-1$ to $2^n-1$. Alternatively, the extra bit could simply provide a 9 bit number (range of 0 to 511), and 128 could be subtracted from every number to represent a range of −128 to 383. Other implementations are possible. The following embodiment provides an algorithm for describing the "out of range" values without increasing the size of the lookup table.

In one implementation, the first embodiment includes a color space converter for an image forming apparatus. The color space converter may include an interface, a memory, and a controller. The interface is configured to receive an input value in a first color space, wherein the input value includes a more significant set of bits and a less significant set of bits. The memory is configured to store a lookup table including interpolation values. At least one of the interpolation values is out of range of the image forming apparatus.

The out of range interpolation value has a value that indicates an impossible quantity of marking material. For example, the out of range interpolation value may indicate a negative quantity of marking material or a quantity that exceeds the capabilities of the image forming apparatus. The out of range interpolation value may be part of a terminal subset of the interpolation values. The interpolation values may be spaced by equal intervals in both the terminal subset of the first color space and a preceding subset of the first color space. The out of range interpolation value may be represented in the lookup table using a first number of bits, and at least one of the remaining interpolation values may be represented using a second number of bits, wherein the first number of bits exceeds the second number of bits.

The controller is configured to select either the preceding subset or the terminal subset of the first color space based on the more significant set of bits, and interpolate an output value in a second color space by using an interpolation value selected from either the terminal subset or the preceding subset based on the less significant set of bits of the input value. The selected interpolation value may be the out of range interpolation value. The color space converter may be integrated into an image forming apparatus as described below.

Second Embodiment

The second embodiment allows the encoding of the information that is "out of range" without increasing the size of the lookup table and without the requirement of additional bits. The nature of mapping function 200, while nonlinear, is somewhat predictable. Sharp changes in slope are rare, and adjacent data points do not have alternating minimum and maximum values. Accordingly, the upper bound and the lower bound for any subset are very likely relatively near to each other with respect to the entire color space.

By limiting the definable gradient for all sub-cubes (i.e., the permissible difference between the lower bound and upper bound in each dimension for each subset), other possible values can be used to indicate that the interpolation algorithm should be performed with output values outside of the range. In other words, if a negative upper bound or an upper bound otherwise outside the range of possible quantities of ink or toner is desired, the upper bound may be encoded as an unlikely value, and the controller 401 configured to remap the upper bound by using the out of range value in place of the unlikely value.

For example, the definable gradient for a color's sub-cube may be ¼ of the total color space, which may be 64 out of the 256 in an 8-bit per color space. The gradient may be measured from all seven of the sub-cube's corners. However, for purposes of discussion, only one dimension will be addressed. If the lower bound is in the first quartile (0 to 63) and the upper bound is in the third quartile (128 to 191), then the range violates the definable gradient restriction, and the upper bound is remapped. One technique for remapping is adding or subtracting ¾ of the span of the dimension of the color space. In the case of 8 bit values, ¾ of the span is 192.

Using this technique, the upper bound of the terminal subset, as stored by the lookup table in memory 403, may be purposely set outside the definable gradient. For example, if the desired output for the lower bound is 15 and the desired output for the upper bound is −1, which is similar to the scenario illustrated by FIG. 7, then the lookup table is populated with 15 for the lower bound and 191 for the upper bound. The controller 401 determines that the difference between 15 and 191 is out of the definable gradient restriction and subtracts 192, resulting in −1 for the lower bound. The controller 401 proceeds with the interpolation techniques discussed above using the upper bound output of −1.

As another example, if the desired output for the lower bound is 240 and the desired output for the upper bound is 256, which is outside of the normal range of 0 to 255, then the lookup table is populated with an output of 240 for the lower bound and an output of 64 for the upper bound. The controller 401 recognizes that the lower bound is in the fourth quartile and the upper bound is in the second quartile. In other words, the controller 401 determines that the difference between 240 and 64 exceeds the definable gradient restriction. Accordingly, the controller 401 adds 192, resulting in 256 for the upper bound. The controller 401 proceeds with the interpolation techniques discussed above using the upper bound output of 256.

In this way, larger and smaller numbers may be included using the same number of lookup table bits without impacting the resolution or accuracy of the lookup table values. Most of the output values in the lookup table may be determined by measurement or by measurement in combination with theoretical manipulation. However, the data values that are outside of the range of possible quantities of ink or toner are purely theoretical and are extrapolated from the known data points.

In one implementation, the second embodiment includes a color space converter. The color space converter may include an interface, a memory, and a controller. The interface is configured to receive an input value in a first color space, wherein the input value includes a more significant set of bits and a less significant set of bits. The memory is configured to store a lookup table including a plurality of subsets of interpolation values. The interpolation values may be spaced by equal intervals in both a first interval in a first subset of the first color space and a second (terminal) subset of the first color space. Each subset of the plurality of subsets of interpolation values includes an upper bound and a lower bound.

The controller is configured to select either the first subset or the second subset of the first color space based on the more significant set of bits. The controller is further configured to calculate a difference between the upper bound and the lower bound of the selected subset and compare the difference to a predetermined threshold. The predetermined threshold is stored in the memory.

When the difference is less than the predetermined threshold, the controller interpolates an output value in a second color space by using an interpolation value selected from the selected subset based on the less significant set of bits of the input value. When the difference meets or exceeds the predetermined threshold, the controller adjusts the upper bound by an adjustment value and subsequently interpolates an output value is a second color space by using an interpolation value selected from the selected subset based on the less significant set of bits of the input value.

The upper bound adjusted by the adjustment value is used to calculate the output value. The adjustment value may be 192. The predetermined threshold may be ¼, ½, or ¾ of a span of the second color space. The predetermined threshold may be a definable gradient restriction defined through an input device. The color space converter may be integrated into an image forming apparatus as described below.

Third Embodiment

The third embodiment provides an estimation of the linear interpretation using division by 15 without requiring the use of divider hardware. While the first and second embodiments change one of the bounds (such as the upper bound) that is used for interpolation, the third embodiment adjusts the interpolation values used in the interpolation.

Figures 9, 10:
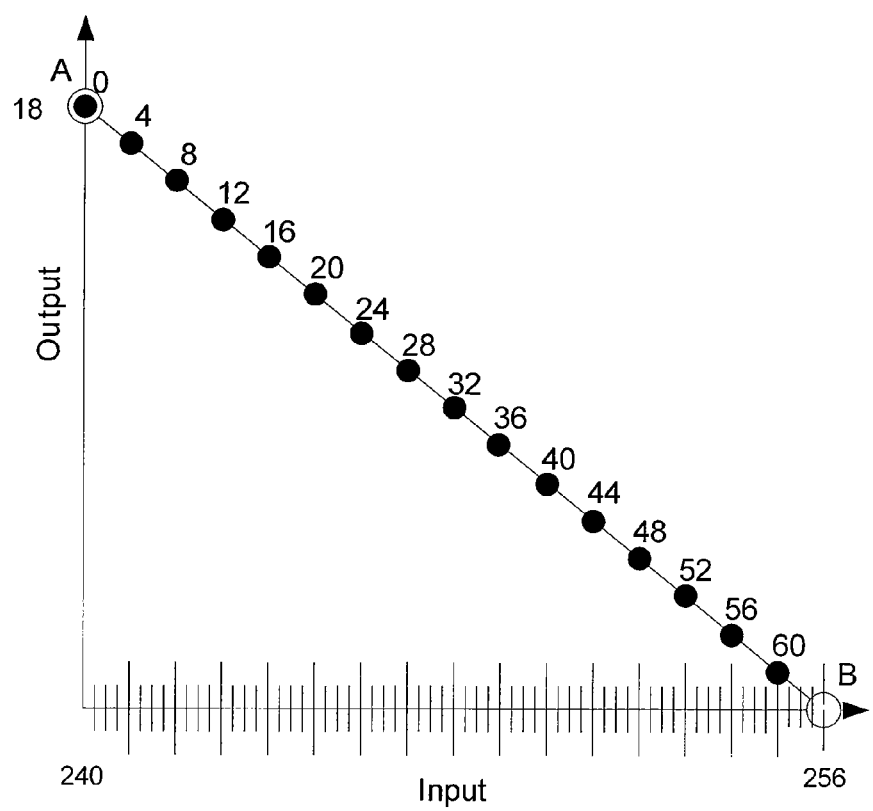
FIG. 9 illustrates an example of interpolation values used in FIG. 6 and the ideal interpolation values.
FIG. 10 illustrates initial interpolation values scaled by a constant factor.

FIG. 9 is a chart illustrating the 16 hypothetical values in FIG. 6. The actual interpolation values are shown in the actual column. The ideal interpolation values calculated by a division of 15 are shown in the ideal column. The difference between the actual and ideal are shown in the error columns. Every interpolation value in the example of FIG. 6 deviates from the ideal location by ¹⁄₁₅.

The deviation may be corrected by "stretching" the interpolation index by multiplying by a scale factor. Effectively, "stretching" the index approximates the division by 15 while permitting division by 16.

Ideally, the index would be stretched by a factor of 16/15, which provides the exact 16 desired samples. However, design constraints may limit the division to a power of 2. Approximations of 16/15 with a power of 2 in the denominator include 17/16, 34/32, 68/64. 137/128, and 273/256. It should be noted that the 4-bit approximation (17/16) is accurate as the 5-bit approximation (34/32) and the 6-bit approximation (68/64). Additional accuracy is obtained using the 7-bit approximation (137/128) and the 8-bit approximation (273/256). The interpolation index may be stretched by multiplying each of the interpolation values by any of the above approximations as a scale factor.

Figures 11, 12:
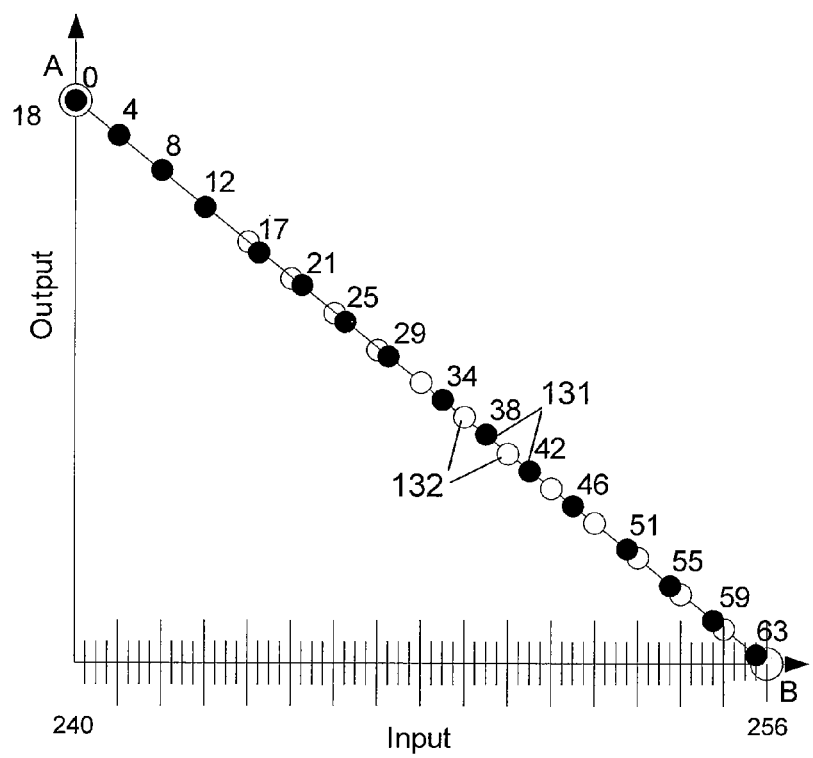
FIG. 11 illustrated final interpolation values scaled by a varying scale factor.
FIG. 12 illustrates the calculation of the interpolation values of FIGS. 10 and 11.

In one implementation, as shown in FIGS. 10, 11 and 12, an algorithm for "stretching" the interpolation graph uses a 4-bit approximation with appended bits and truncation. This is a special case that provides particularly efficient calculations.

FIG. 10 illustrates the initial interpolation values of FIG. 6 scaled by a factor of 4. The scaled initial interpolation values 132 are shown again in FIG. 11.

FIG. 12 illustrates that scaling by a factor of 4 may be achieved by appending two zeroes to the least significant portion of a binary number, as shown in the transition from column 121 to column 122.

The interpolation values are additionally scaled by a varying scale factor. The varying scale factor may be one or more of the most significant bits of the interpolation values. For example, FIG. 12 illustrates that the two most significant bits of the initial interpolation values in column 122 are moved to the least significant portion of the interpolation values to generate the final interpolation values 131 in column 123, as shown in FIG. 11. When the two most significant bits of the interpolation values are used to scale the interpolation values, consecutive intervals between interpolation values become unequal, which is shown not to scale in FIG. 11. Effectively, the interpolation graph has been "stretched."

FIG. 13 is a table that demonstrates how the interpolation values are "stretched" to better approximate the ideal interpolation values. The input column shows the initial interpolation values, which correspond to the distance between the lower bound and the less significant set of bits of the input value. The index column shows the input column multiplied by 4, which may be accomplished by appending two bits to the least significant side of the initial interpolation values. The actual column includes the final interpolation values as scaled by the varying scale factor, which may be accomplished by replacing the least significant N bits of the initial interpolation values with the most significant N bits of the initial interpolation values. In the example shown, N is 2, but other values of N are possible. The actual' column in the actual column divided by 4 to relate back to the input magnitudes. The ideal column indicates the interpolation values that would be calculated using a hardware divider. The error column illustrates the deviation between the final interpolation values and the ideal interpolation values.

Figure 14:
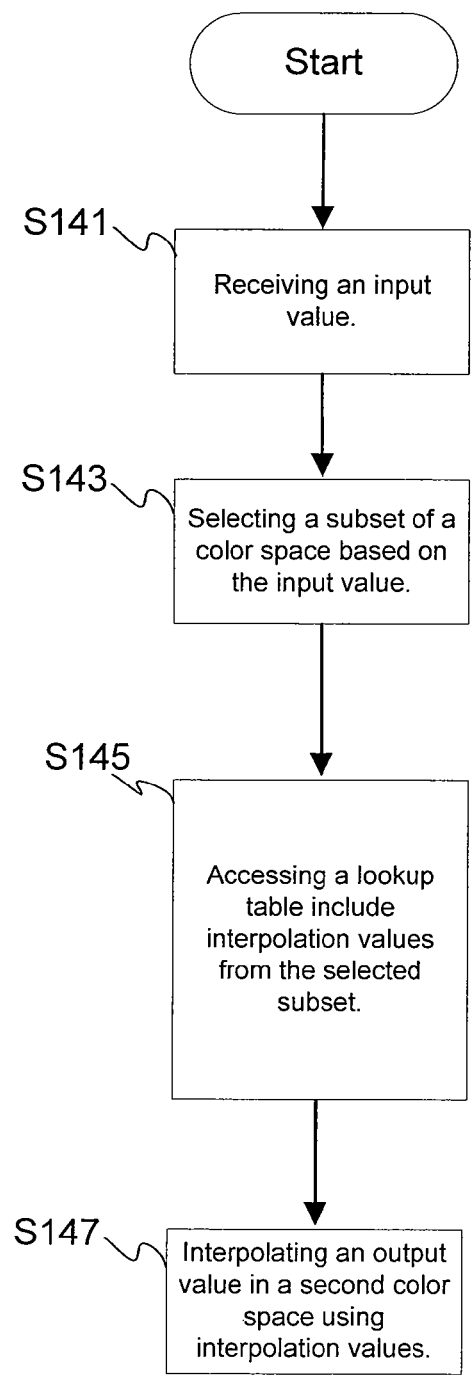
FIG. 14 illustrates a flow chart for converting color spaces according to the third embodiment.

FIG. 14 illustrates a method of converting color spaces. At S141, interface 405 receives an input value. The input value is a point in a first color space. The input value may be 24-bits, including an 8-bit index in each of three colors component. Each color component value may include a more significant set of bits and a less significant set of bits. The first four bits may be the more significant set of bits, and the last four bits may be the less significant set of bits. At S143, the controller 401 selects a subset of the first color space based on the more significant set of bits. The subset may be the last subset (terminal subset) in the particular dimension of the color space or it may be any other subset (preceding subset).

At S145, the controller 401 accesses a lookup table stored in memory 403. The lookup table may be generated using any one of the embodiments above. For example, the lookup table may include interpolation values for the plurality of subsets making up the color space. The interpolation values for a preceding subset include a first set of intervals spaced by a first interval. The interpolation values for the terminal subset include a second set of intervals spaced by a second interval. The first interval is less than the second interval. The ration of the first second interval to the first interval by any of the approximation values discussed above, which include but are not limited to 16/15, 17/16, 34/32, 68/64, 137/128, and 273/256.

The second set of intervals may also vary. For example, the second set of intervals may successively be larger. In other words, the interpolation values for the terminal subset may be scaled by a varying scale factor so that consecutive intervals between interpolation values are unequal. The varying scale factor may be generated by concatenating at least one significant bit to the least significant place of the interpolation values. At S147, the controller 401 interpolates an output value in a second color space using at least one of the interpolation values selected from either first set of interpolation values or the second set of interpolation values.

Using the example above from Equation 1, the third embodiment produces a closer approximation of the ideal result, which corresponds to the surface 103, 105, or 107 from FIG. 1. As shown in Equation 2, for the same input of 255, the third embodiment results in an output of 0.282, which when rounded 0 for use in a binary system is the exact ideal value.

$$\text{Output}[255] = \text{Output}[X1] + \qquad [\text{Eq. 2}]$$
$$(\text{Output}[X2] - \text{Output}[X1]) \cdot \frac{\text{mod}((\text{In} - X2) * 17, 64)}{(X2 - X1)}$$

$$\text{Output}[255] = 18 + (-18 * \text{mod}(15 * 17, 64) / 64)$$

$$\text{Output}[255] = 18 - 18 * 63 / 64$$

$$\text{Output}[255] = 0.282$$

Figure 15:
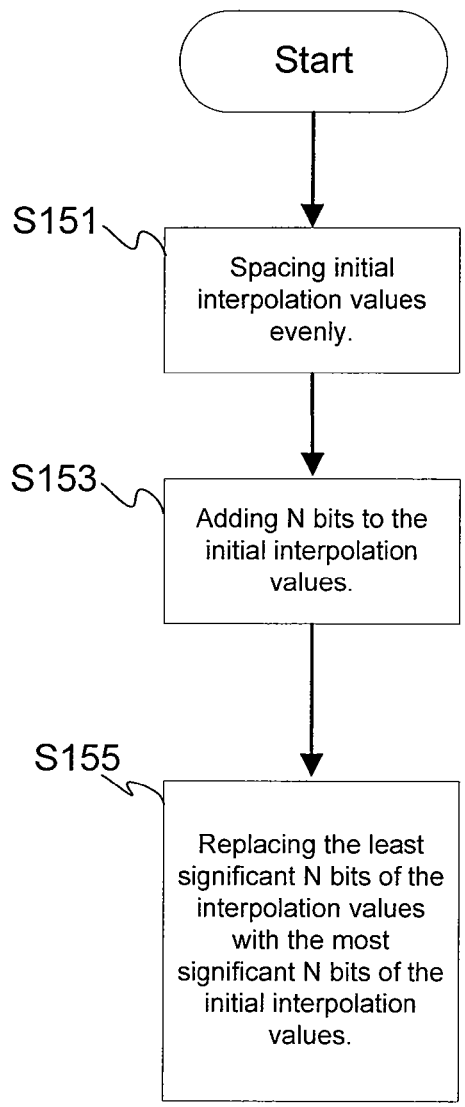
FIG. 15 illustrates a flow chart for generating a color space conversion table according to the third embodiment.

FIG. 15 is a method for generating a color space conversion table. The color space conversion table may be generated by controller 401 and stored in memory 403. Alternatively, the color space conversion table may be generated in advance by an external device and loaded into memory 403. At S151, initial interpolation values are spaced evenly between an upper bound of a subset of the color space and a lower bound of the subset of the color space, as shown by FIG. 6. At S153, N bits are appended to the initial interpolation values. At S155, the appended N bits are replaced with the most significant N bits of the initial interpolation values. This process effectively scales the initial interpolation values by a varying scale factor, where a distance between consecutive scaled interpolation values progressively varies from the lower bound to the upper bound, as shown by FIG. 11.

In addition to RGB, CMY, and CMYK, other color spaces may used. For example, cylindrical representations may be used. Cylindrical representation includes hue, saturation, value (HSV); hue, lightness, saturation (HLS); hue, saturation, brightness (HSB); or hue, saturation, and intensity (HSI). The cylindrical representations are represented using a cylinder rather than the cube 100 of FIG. 1. The angle around the vertical axis corresponds to hue, the distance from the axis corresponds to saturation, and the distance along the axis corresponds to the third component, which may be value, lightness, brightness, or intensity. Hue is defined as the extent to which the color is different from the primary colors. Saturation is defined as the intensity of the hue.

Other color spaces may include the luminance, red-yellow scale, green-blue scale (La*b*), luminance, red-green scale, yellow-blue scale (Luv), or luminance, blue difference chrominance, and red difference chrominance (Y'CbCr). Luminance is defined as measure of the intensity of light. Chrominance is the difference between two color components.

The embodiments disclosed herein may be implemented in a wide variety of devices. Any device that displays or renders an output may include a color space converter. For example, the device may include a cathode ray tube (CRT), a liquid crystal display (LCD), a light emitting diode (LED), a plasma, or other type of television or monitor.

A printer or image forming apparatus may also employ the color space converter. A wide variety of printing technologies may be used. Inkjet printing technology controls the size and/or placement of droplets of ink as they are propelled onto a recording medium. In electrophotography (e.g., laser printing), a laser removes charge from a photoconductive drum such that toner is picked up in the charged areas and transferred to a print medium by at least one of contact, electrical current, or heat. In dye-sublimation, a dye is heated to transfer an image to a print medium (e.g., the dye may be transferred from a ribbon to the recording medium). In thermal transfer printing, a coating of ribbon is melted so that it stays glued to the recording medium.

Figure 16:
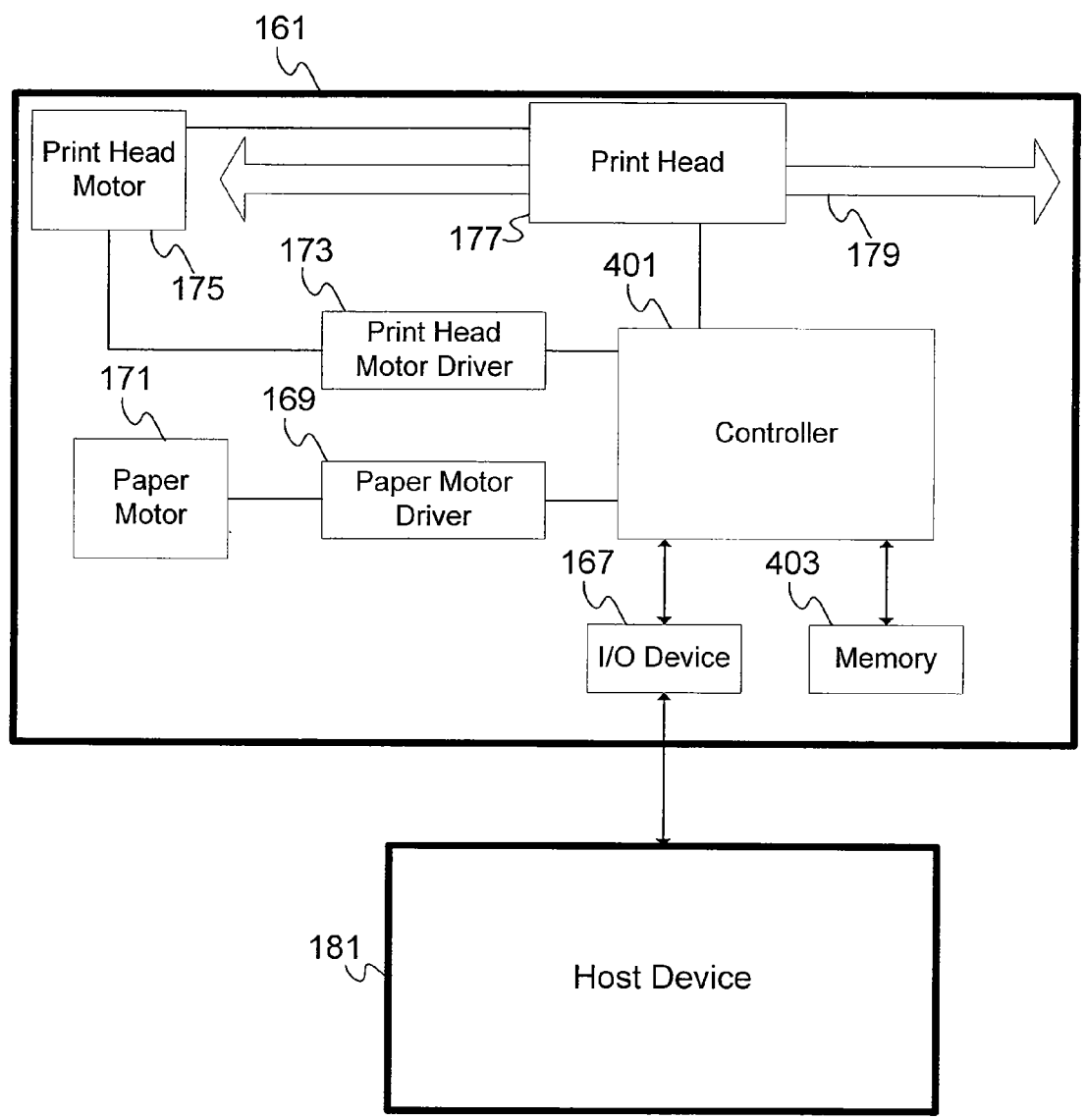
FIG. 16 illustrates an inkjet printer embodying the color space converter.
Figure 17:
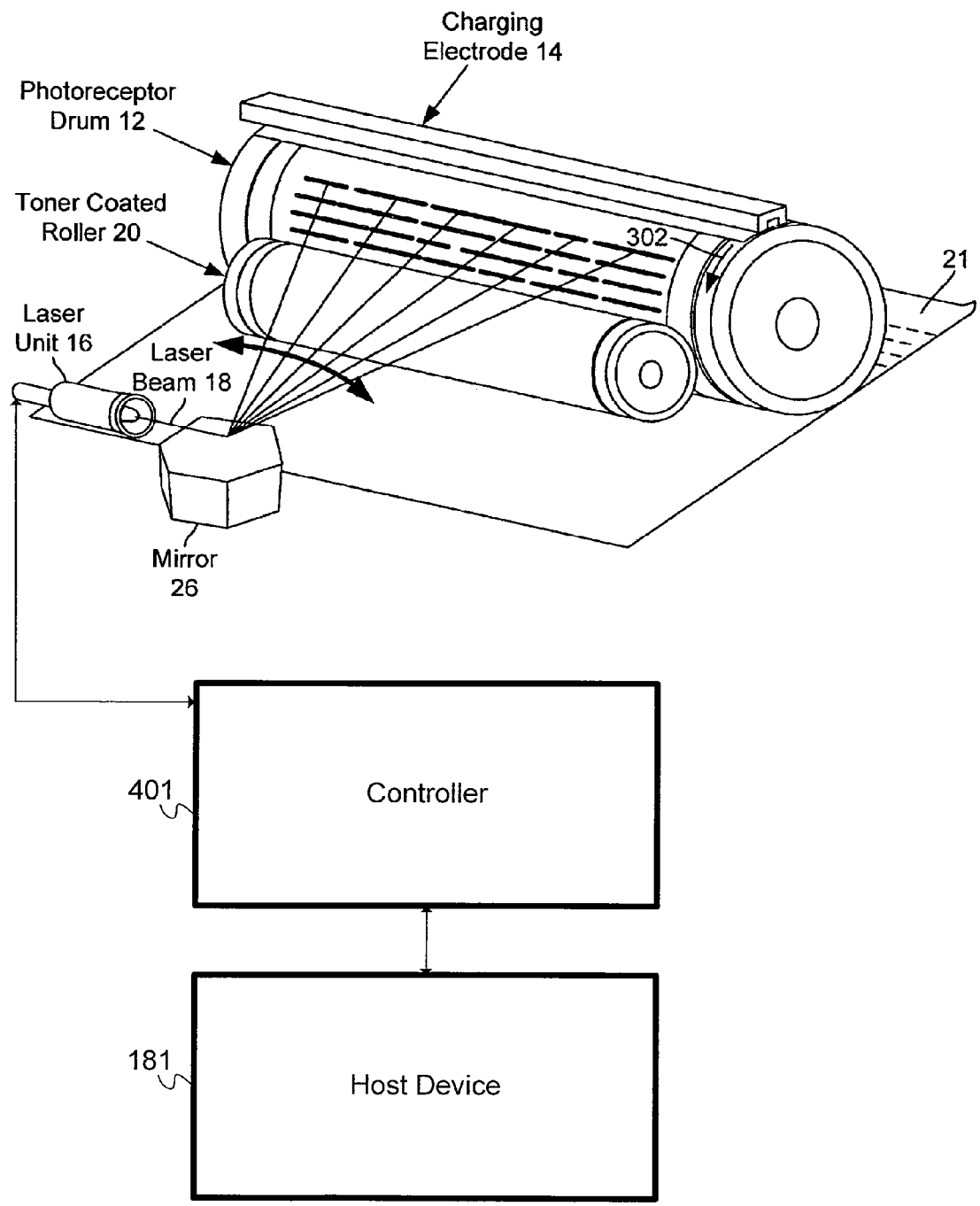
FIG. 17 illustrates a laser printer embodying the color space converter.

As discussed above, the controller 401 and memory 403 may be incorporated in a dedicated hardware pipeline. Alternately, the controller 401 may be implemented using a printer controller. FIGS. 16 and 17 illustrate examples of printers embodying color space conversion.

FIG. 16 illustrates one implementation of an inkjet printer 161 embodying the color space converter. Printer 161 includes a printing device, such as print head 177, which travels along print axis 179. Print head 177 may comprise an inkjet carriage. A print head motor 175 moves the print head 177 along print axis 179 under the direction of print head motor driver 173. A paper motor 171, controlled by paper motor driver 169, moves recording media through printer 161 and past print head 177. The functions of paper motor 171 and print head motor 175 may be implemented using a single motor.

The controller 401 provides command signals to paper motor 171, print head motor 175, and print head 177. As discussed above, the color space converter may be incorporated in a dedicated hardware pipeline. Alternately, the color space converter may be incorporated into control circuitry of the printer 161. Controller 401 is coupled to memory 403 and communicates with a host device 181 through input/output device 167. Memory 403 may alternatively be located internal to controller 401. The controller 401 may be a digital signal processor, an application specific integrated circuit (ASIC), a field programmable gate array, a logical digital circuit, or other now known or later developed controller.

FIG. 17 illustrates one implementation of an electrophotographic image forming apparatus embodying the color space converter. The term electrophotographic image forming apparatus includes at least laser printers, photocopiers, and combinations thereof such as multi-function printers (MFPs). Any of the implementations of the color space converter may be incorporated into control circuitry of the electrophotographic image forming apparatus. The printer controller 401 controls laser unit 16 to direct a laser beam 18, via polygon mirror 26 to expose portions of photoreceptor drum 12 which has been charged by charging electrode 14, creating an electrostatic image. Toner coated roller 20 delivers toner to the photoreceptor drum 12 which adheres to the electrostatic image. The toner is delivered to recording medium 21 and fixed by a heating roller (not shown). Arrow 302 indicates the direction of the photoreceptor drum 12.

In the case of host-based printing, the host performs the printer processing before sending data to the printer. The printer processing may include formatting and halftoning. In addition, the printer processing may include color space conversion. In other words, the color space converter may be embodied on the host. The host may be a personal computer, a server, a portable device such as a smart phone or a personal digital assistant (PDA), or any device capable of sending print jobs to the printer.

Instructions for performing color space conversion in the process discussed above may be stored on any computer readable medium. As used herein, a "computer readable medium" includes, but is not limited to, non-volatile media, and volatile media. Non-volatile media may include, for example, optical disks, and magnetic disks. Volatile media may include, for example, semiconductor memories, and dynamic memory. The computer readable medium may be any non-transitory medium. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Instructions for instructing a device in the process discussed above may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

Although specific embodiments have been described and illustrated, the invention is not to be limited to the specific forms or arrangements of parts so described and illustrated. The scope of the invention is to be defined by the claims appended hereto and their equivalents. It is intended that the foregoing detailed description be understood as an illustration of selected forms that the invention can take and not as a definition of the invention. It is only the following claims, including all equivalents, which are intended to define the scope of this invention.

What is claimed is:

1. A method of converting color spaces, the method comprising:
    receiving an input value in a first color space, wherein the input value includes a first set of bits and a second set of bits;
    selecting a subset from a plurality of subsets of the first color space based on the first set of bits, wherein the plurality of subsets includes (i) a terminal subset and (ii) at least one preceding subset that is adjacent to the terminal subset;
    accessing, using a controller, a lookup table based on the selected subset of the first color space, wherein the lookup table includes
        (i) a first set of interpolation values, at least two of the interpolation values in the first set being spaced by a first interval for the at least one preceding subset, and
        (ii) a second set of interpolation values, at least two of the interpolation values in the second set being spaced by a second interval for the terminal subset, wherein the first interval is different from the second interval; and
    interpolating, using the controller, an output value in a second color space using an interpolation value selected from either the first set of interpolation values or the second set of interpolation values based on the second set of bits of the input value.

2. The method of claim 1, wherein the second set of interpolation values are scaled by a varying scale factor so that consecutive intervals between interpolation values are unequal.

3. The method of claim 2, wherein the varying scale factor is N most significant bits of the interpolation values, and the varying scale factor replaces N least significant bits of the interpolation values to scale the interpolation values.

4. The method of claim 1, wherein the subset of the first color space is selected from the group consisting of prism interpolation, tetrahedral interpolation, trilinear interpolation, tricubic interpolation, radial interpolation, pruned interpolation, and radial and pruned interpolation.

5. The method of claim 1, further comprising:
    sending the output value to a display device operating in the second color space.

6. The method of claim 1, further comprising:
    sending the output value to an image forming device operating in the second color space.

7. The method of claim 6, wherein the output value corresponds to a plurality of multi-bit values, with each multi-bit value indicating a quantity of marking material of a plurality of colors in the second color space.

8. The method of claim 1, wherein the first set of interpolation values are scaled by a constant scale factor so that consecutive intervals between interpolation values are equal.

9. The method of claim 8, wherein the constant scale factor is 16/15, 17/16, 34/32, 68/64, 137/128, or 273/256.

10. The method of claim 1, wherein the first set of bits is one or more most significant bits of the input value and the second set of bits is one or more least significant bits of the input value.

11. A color space converter comprising:
    an interface configured to receive an input value in a first color space, wherein the input value includes a more significant set of bits and a less significant set of bits;
    a memory configured to store a lookup table, the lookup table including interpolation values spaced by
        (i) at least a first interval in a first subset of the first color space, and
        (ii) at least a second interval in a second subset of the first color space, wherein the first interval is different from the second interval; and
    a controller configured to:
        select either the first subset or the second subset of the first color space based on the more significant set of bits, and
        interpolate an output value in a second color space by using an interpolation value selected from either the first subset or the second subset based on the less significant set of bits of the input value.

12. The color space converter of claim 11, wherein:
    the first color space includes red, green, and blue (RGB); and
    the second color space includes cyan, magenta, and yellow (CMY).

13. The color space converter of claim 11, wherein interpolation values of the second subset are scaled by a varying scale factor so that consecutive intervals between interpolation values are unequal.

14. The color space converter of claim 11, wherein interpolation values of the first subset are scaled by a constant scale factor so that consecutive intervals between interpolation values are equal.

15. The color space converter of claim 14, wherein the constant scale factor is selecting from the group consisting of 16/15, 17/16, 34/32, 68/64, 137/128, and 273/256.

16. The color space converter of claim 11, wherein the output value corresponds to a plurality of multi-bit values, with each multi-bit value indicating a quantity of marking material of a plurality of colors in the second color space.

17. A method of generating a color space conversion table for conversion from a first color space to a second color space, the method comprising:
    spacing, using a controller, initial interpolation values between (i) a lower bound of a dimension of a subset of the color space and (ii) an upper bound of the dimension of the subset of the color space; and
    scaling, using the controller, the initial interpolation values by a scale factor, wherein a distance between consecutive scaled interpolation values progressively varies from the lower bound of the dimension of the subset of the color space to the upper bound of the dimension of the subset of the color space such that, within the subset of the color space, at least one interval between scaled interpolation values at the upper bound is greater than at least one interval between scaled interpolation values at the lower bound.

18. The method of claim 17, wherein the initial interpolation values are evenly spaced from the lower bound of the dimension of the subset of the color space to the upper bound of the dimension of the subset of the color space.

19. The method of claim 17, wherein:

spacing initial interpolation values comprises adding N bits to the initial interpolation values; and scaling the initial interpolation values by the scale factor comprises generating final interpolation values by replacing the least significant N bits of the initial interpolation values with the most significant N bits of the initial interpolation values.

20. The method of claim 17, wherein the color space conversion table is stored in an image forming device operating in the second color space and output values in the color space conversion table correspond to quantities of ink or toner.

\* \* \* \* \*